Jan. 20, 1925.                                            1,523,638
                    A. L. FREEDLANDER ET AL
        ARTICLES OF MANUFACTURE SUCH AS HANDLES AND THE LIKE
                  Filed Dec. 26, 1922      2 Sheets-Sheet 2
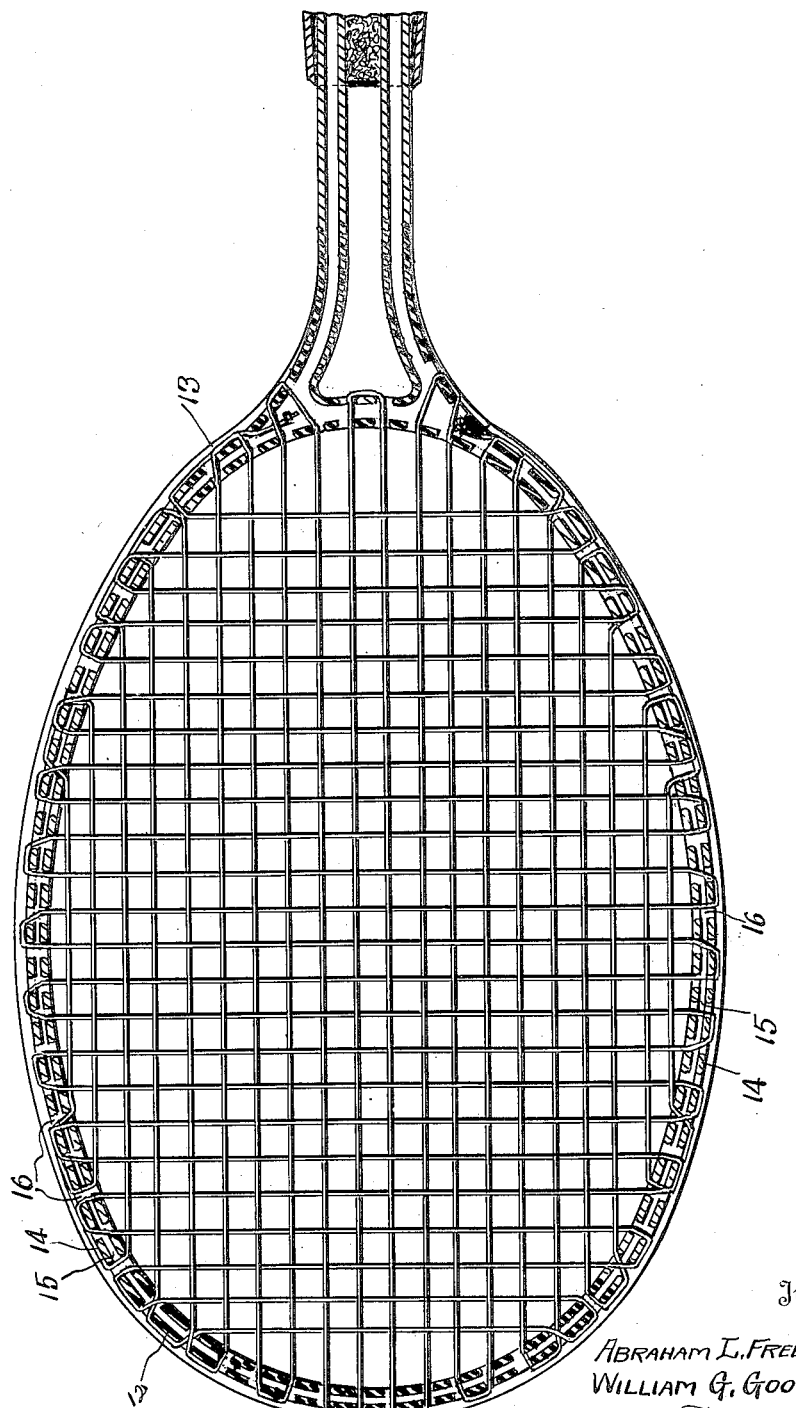
Inventors
ABRAHAM L. FREEDLANDER,
WILLIAM G. GOODWIN,
By Toulmin & Toulmin
Attorneys Patented Jan. 20, 1925.

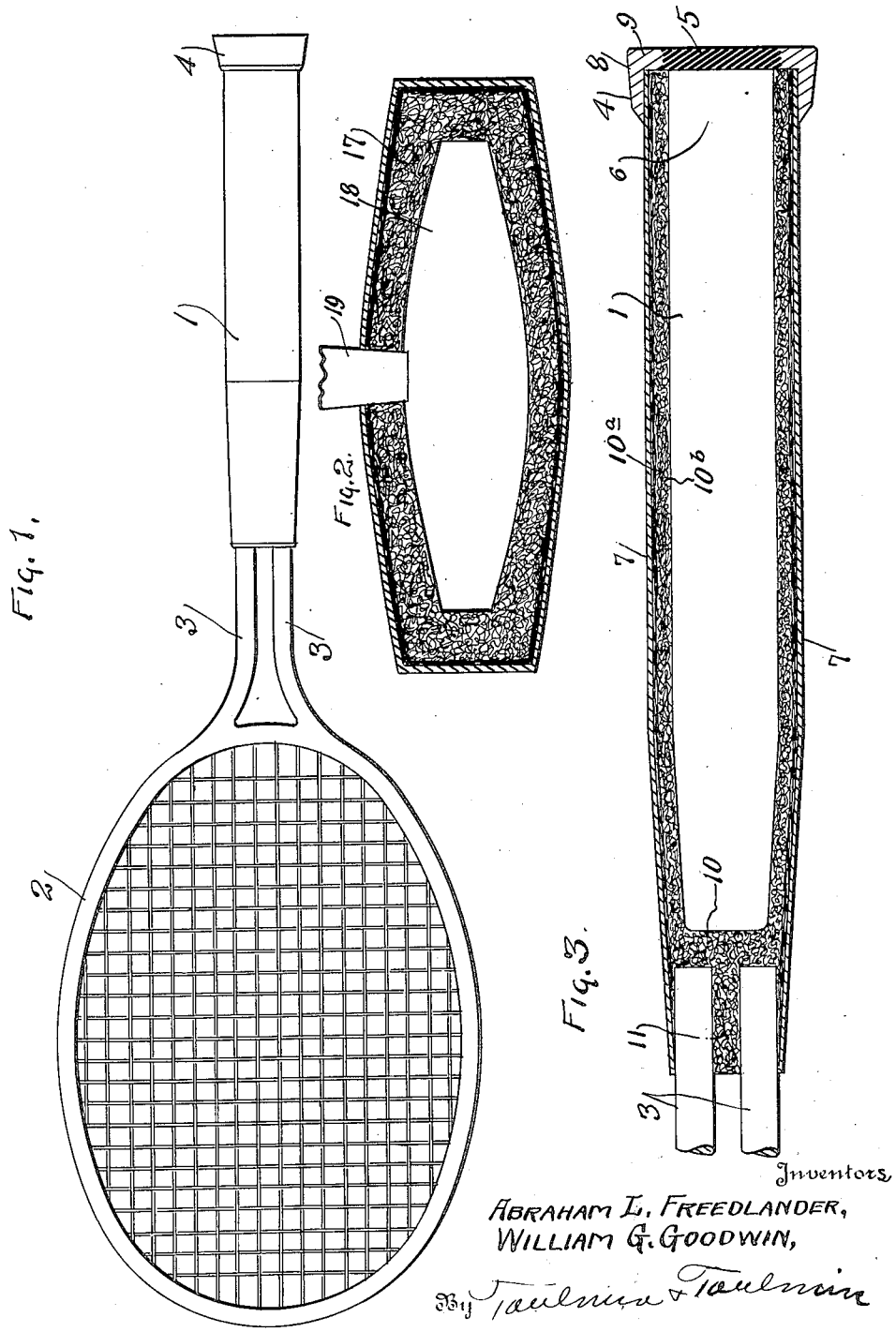

1,523,638

UNITED STATES PATENT OFFICE.

ABRAHAM L. FREEDLANDER AND WILLIAM G. GOODWIN, OF DAYTON, OHIO, ASSIGNORS TO THE RUBBER DEVELOPMENT COMPANY, OF DAYTON, OHIO, A TRUST ESTATE.

ARTICLES OF MANUFACTURE SUCH AS HANDLES AND THE LIKE.

Application filed December 26, 1922. Serial No. 608,979.

*To all whom it may concern:*

Be it known that we, ABRAHAM L. FREEDLANDER and WILLIAM G. GOODWIN, citizens of the United States, residing at Dayton, in the county of Montgomery and State of Ohio, have invented certain new and useful Improvements in Articles of Manufacture Such as Handles and the like, of which the following is a specification, reference being had therein to the accompanying drawing.

Our invention relates to a new article of manufacture.

It is the object of our invention to provide a new article of manufacture such as a rubber handle of peculiar characteristics for steel tennis rackets or tennis rackets of other material such as rubber.

It is our object to provide such a tennis racket handle which will have the characteristics of resistence to corrosion, wear, breakage, shock, and the like.

It is our object to provide a handle which will positively grip the racket proper so that it cannot be detached therefrom.

It is a further object of our invention to provide a handle which is hollow and therefore very light.

It is a further object to provide a handle, the weight of which may be varied to suit the requirement of balancing the racket and to suit the requirement of its total weight.

It is an additional object of our invention to provide a handle which will resist the action of acids, and the like.

It is our object to provide a handle which will bend and be capable of being deformed under strain and shock like steel but still retain many of the resilient characteristics and facilities for recovery of rubber.

It is an additional object of our invention to provide a handle of such tenacity and resiliency that it will permanently adhere to other materials of different coefficients of expansion such as steel forming with such materials a permanent union.

It is a further object of our invention to provide a handle having a highly resilient soft cover which will yieldingly engage the hand preventing abrasion and which will adhere closely to the core of the handle.

It is an additional object of our invention to provide the base of the handle with means for preventing the base from being damaged where it bridges the open end of the handle while at the same time providing highly resilient protection for the corners of the handle to take and receive blows usually accorded this part of the racket. The medallion provided on the base of the handle by this kind of cap also furnishes a permanent form of name plate or position for the application of a trade mark.

It is our object in providing this compound, which has the foregoing characteristics when completed and applied to various objects of commerce and sport, to have a compound susceptible of being molded in varying shapes and sizes for varying purposes by quantity production.

It is our object to provide a compound that has a uniform strength, is homogeneous or may be of successive densities, as desired, in order to produce the requisite effects.

It is our object to provide a tennis racket of rubber with the exception of the strands constituting the webbing in the face of the racket. Such a racket would be susceptible of using either steel wires or gut as may be desired and is imprevious to the effects of temperature, moisture and the like.

It will be understood that the adaptation of this medium to a tennis racket is illustrative and that it is susceptible of being employed in articles of commerce such as automobile steering wheels, bicycle handles, switch handles, etc., or articles of sport such as the heads of polo mallets where the economical methods of producing it, its physical characteristics and its dielectric properties make it especially adaptable.

We comprehend within our invention such varying uses.

Referring to the drawings:

Figure 1 is a plan view of the steel tennis racket having a handle composed of our compound.

Fig. 2 is a section of the head of a polo mallet.

Fig. 3 is a section of the handle of the tennis racket.

Fig. 4 is a section of the head of a tennis racket made completely of rubber. The strings may be made of other material, if desired.

Referring to the drawings in detail:

1 generally refers to the handle composed of the compound consisting of the following ingredients:

Smoke sheets of rubber, rosin oil, sulphur, ammonium bicarbonate, dehydrated lime, and ethyl-idene-aniline, and gas black.

It is preferred to mix these several ingredients in fifty to one hundred pound lots. The following is a description of the method of mixing and preparing this compound on the basis of a one hundred pound lot.

We take the smoke sheets of rubber and masticate them for fifty minutes according to the usual practice. In the place of the smoke sheets we may substitute fine pará having the characteristic of great strength. We select 61 pounds and 12 oz. of such rubber.

It is essential that this rubber when finally made up be used before it is twenty-four hours old because after that time it begins to recover its resiliency.

When these smoke sheets are worked on the mill until plastic at which time they have achieved a temperature of approximately 130° to 180° Fahrenheit, the latter temperature being approximately the safety temperature, we add rosin oil to the extent of 1 pound and 13 oz. This is a softening and volatilizing agent. We then add sulphur by sifting it in slowly as the rubber is being worked on the mill. We use for this purpose 18 pounds and 6 oz. of the sulphur which is of the fineness to pass through a 300 mesh screen. The sulphur is used for the usual purpose in compounds for promoting the vulcanization. Thereafter while the mixing is taking place the dehydrated lime which has been ground as fine as it is possible to secure it is incorporated in the mass to the extent of 3 pounds and 1 oz. The lime is used to toughen the compound and accelerates the reaction between the rubber and the sulphur. We then add 1 pound and 8 oz. of gas black for the purpose of giving color and some body to the mixture, but this may be omitted.

In the meanwhile, the ethyl-idene-aniline has been heated in a steam jacketed kettle to about the temperature of boiling water, that is to about 212° Fahrenheit. We then dip this out of the kettle and incorporate 1 pound and 4 oz. thereof in the mixture in the mill. This acts as an accelerator to the reaction and adds tenacity to the resulting compound.

The last ingredient added is the ammonium bicarbonate to the extent of 4 pounds and 12 oz. This is added to give the spongy or aerated character to the compound. It is added last because the heat of mixing in the mill would volatilize it if added earlier in the process.

It is essential that this compound be molded and vulcanized or blown within twelve hours after it has been mixed. The preferred practice is to mix fresh batches each day.

The temperature of the room in which it is kept and in which it has been mixed should be approximately 70° Fahrenheit.

When it is desired to mold this compound into finished articles it is placed in a metal mold which is jacketed for receiving steam under pressure and cold water. The compound is put in the mold and a mandrel is inserted about which the compound is to be molded or the article itself on which the compound is to be molded may be inserted in the mold, or both.

The mandrel is sometimes used to hold the article in position while the compound is molded or blown.

The term "blown" is used because, when the heat is applied to the mold, the compound expands and very great pressure is set up in the mold during this molding process. This results in the compound having a porous appearance.

In preparing the mold the space between the mandrel and the article about which the compound is to be molded is approximately half filled with the compound allowing the other half of the area for the expansion of the compound during the molding process.

In some cases where it is desired to have a soft rubber coating on the resulting article the mold is lined with a soft rubber sheet. It is preferable to cement this sheet to the inside of the mold. The sheet itself is about one-sixty-fourth of an inch in thickness.

When the mold is closed the steam is turned on and the mold is kept under heat for one hundred thirty-five minutes approximately. About one-third of this time in the beginning of the molding process the pressure of the steam is being gradually increased until it reaches a maximum of eighty pounds. The remainder of the time the steam is held at an eighty pound pressure. At the end of the period the steam is cut off and cold water is circulated through the mold to chill it and when it has been cooled the mold is opened, the mandrel is extracted and the finished article is thus completed.

These times are approximate depending upon the exact character of the resulting material desired. The time may be varied from fifty minutes to one hundred thirty-five minutes by varying the quantity of lime and ethyl-idene-aniline. The larger the quantity of such agents the less time needed.

It will be understood that these quantities are approximate and some variation is possible.

In forming the handle 1, a mold having passage-ways for the passage of steam or water is employed. Inasmuch as it is usually desired to form a soft rubber coating for the compound, the mold is lined with a rubber sheet so that when the article is blown the rubber sheet will be securely vulcanized to the exterior of the handle. A mandrel is provided about which the handle is molded and one end of the mandrel is adapted to receive the ends of the throat members 3 of the circular frame work 2 to hold them in position while the compound is being blown or molded, about them. The mold is opened up after the treatment of the compound has been effected and then the mandrel is withdrawn leaving the handle molded on the racket. The frame work 2 and the throat members 3 may be made of either hard rubber or some similar compound or of steel, depending upon the peculiar characteristic desired by the user of such racket and the conditions of its use.

The handle is provided with a cup shaped base 4 on the outer face of which at the end of the handle is a relatively hard portion 5 bridging the channel-way 6 within the handle. This medallion 5 provides a ready means of mounting the maker's name and mark and also prevents the end of the handle being punched in by some blow applied thereto.

The handle is preferably provided with a soft rubber coating 7 to prevent abrasion of the hand of the user. The portions 8 and 9 of the cap over the end of the handle are also highly resilient rubber in order to take the blows which are usually received on the handle at these points. The more rigid portion of the handle designated 10, made of our compound, may be homogeneous or may be of successive densities as indicated at 10$^a$ and 10$^b$ which progressive densities are sometimes of value.

The throat pieces 3—3 are embedded into the end 11 of the handle being molded therein under pressure according to the method hereinbefore described. In case the frame and throat members are composed of a steel tube which is comprehended within our invention which embraces a rubber handle having the characteristics of our compound and a steel frame work, it will be found that the features of resiliency of steel may be combined with the advantages of a non-corrosive handle, unaffected by conditions of temperature, moisture and the like, while there will be a positive union of permanent character between the two materials.

Again, if it is desired to make the frame work of such material as hard rubber which we comprehend within our invention it will be found that a racket is provided which is completely inert and will not be affected so far as the frame work and handle are concerned by any conditions of moisture, temperature, salt air, etc., all of which are important factors not only in use but also in connection with the shipment of such goods overseas and in foreign countries where the conditions of temperature, moisture, packing, and the like are severe on such materials as steel and wood.

The strings may be either of rubber, gut or steel, as desired.

If the racket is of hard rubber it may be balanced properly by providing the top of the racket with a portion 12 of greater density and a portion 13 may likewise be provided near the throat of the racket where both greater weight or greater strength may be desired.

This racket of hard rubber has a frame work of tubular construction consisting of an outer wall 14 and a space 15 therein with apertures 16 in the walls 14 for the passage of the strings.

In Figure 2 will be seen in section the head of the polo mallet which has to withstand conditions of use of great severity. This head is composed of our compound designated 17 having a hollow portion or chamber 18 therein. The shaft of the mallet is molded into the head as at 19.

While we have shown and described certain features as constituting our invention, it will be understood that parts have been shown for purposes of illustration only, and that we do not desire to be limited to such details, as obvious modifications will occur to persons skilled in the art.

Having thus fully described our invention, what we claim as new and desire to secure by Letters Patent, is:—

1. In a new article of manufacture, a tennis racket consisting of a frame and throat members, and a handle molded on the throat members consisting of a hard rubber core and a relatively soft resilient covering therefor.

2. In a new article of manufacture, a tennis racket consisting of a frame and throat members, and a handle molded on the throat members consisting of a hard rubber core and a relatively soft resilient covering therefor, and a cap member on the end of the handle.

3. In a new article of manufacture, a tennis racket consisting of a frame and throat members, a handle having one end thereof molded on the throat members and the balance of the handle hollow, and a cap member closing the outer open end of the handle.

4. In a new article of manufacture, a tennis racket consisting of a frame and throat members, a handle having one end thereof molded on the throat members and the balance of the handle hollow, and a cap member closing the outer open end of the handle, said cap member consisting of relatively soft and resilient side portions and peripheral portions with a relatively hard central portion engaging the ends of the open end of the handle and bridging the open end thereof.

5. In a new article of manufacture, a tennis racket consisting of a frame and throat members, a handle having one end thereof molded on the throat members and the balance of the handle hollow, and a cap member closing the outer open end of the handle, and a relatively resilient covering on said handle.

6. In a new article of manufacture, a tennis racket consisting of a frame and throat members, a handle having one end thereof molded on the throat members and the balance of the handle hollow, and a cap member closing the outer open end of the handle, said cap member consisting of relatively soft and resilient side portions and peripheral portions with a relatively hard interior portion engaging the ends of the open end of the handle and bridging the open end thereof, and a relatively resilient covering on said handle.

7. In a new article of manufacture such as a handle, of a hollow structure consisting of portions of varying degrees of porosity and density the inner portion of said handle being relatively porous, the next outer portion homogeneous therewith being relatively dense and both of said portions constituting a structure highly resistant to shock but capable of being deformed without breaking, said handle being capable of resistence to most acids, fumes and electric current.

8. In a new article of manufacture such as a handle, of a hollow structure consisting of portions of varying degrees of porosity and density the inner portion of said handle being relatively porous, the next outer portion homogeneous therewith being relatively dense and both of said portions constituting a structure highly resistant to shock but capable of being deformed without breaking, said handle being capable of resistance to most acids, fumes and electric current, and a relatively soft rubber coating integral therewith.

9. In a new article of manufacture such as a tennis racket, a frame and throat members of rubber composition having a plurality of apertures in the frame and throat members for the threading of strings therethrough, strings, and a handle molded on the throat members also of rubber composition having a hollow interior.

10. In a new article of manufacture such as a tennis racket, a frame and throat members of rubber composition having a plurality of apertures in the frame and throat members for the threading of strings therethrough, strings, and a handle molded on the throat members also of rubber composition having a hollow interior, a cap member closing the hollow open end of the handle and a soft rubber coating on the handle.

11. In a new article of manufacture such as a tennis racket, a frame and throat members of rubber composition having a plurality of apertures in the frame and throat members for the threading of strings therethrough, strings, and a handle molded on the throat members also of rubber composition having a hollow interior, a cap member closing the hollow open end of the handle and a soft rubber coating on the handle, said cap member having side and peripheral portions of relatively soft rubber and a center portion on the end of relatively hard rubber.

12. A new article of manufacture consisting of a tennis racket of rubber.

13. A new article of manufacture consisting of a tennis racket of rubber and strings of different material.

In testimony whereof we affix our signatures.

ABRAHAM L. FREEDLANDER.
WILLIAM G. GOODWIN.